United States Patent [19]

Enein

[11] 4,306,239
[45] Dec. 15, 1981

[54] MICROWAVE LANDING SYSTEMS

[75] Inventor: Mohamed H. Enein, Woking, England

[73] Assignee: Plessey Handel und Investments AG, Zug, Switzerland

[21] Appl. No.: 162,444

[22] Filed: Jun. 24, 1980

[30] Foreign Application Priority Data

Jul. 6, 1979 [GB] United Kingdom ............ 23730/79

[51] Int. Cl.³ ............................................. G01S 1/16
[52] U.S. Cl. ............................................. 343/108 M
[58] Field of Search ............ 343/100 SA, 854, 108 M, 343/112 TC

[56] References Cited

U.S. PATENT DOCUMENTS 3,806,935  4/1974  Toman .......................... 343/108 M
4,129,870  12/1978  Toman .......................... 343/108 M
4,178,581  12/1979  Willey, Sr. .................... 343/100 SA

FOREIGN PATENT DOCUMENTS 1515501  6/1978  United Kingdom .

Primary Examiner—Theodore M. Blum
Attorney, Agent, or Firm—Fleit & Jacobson

[57] ABSTRACT

A system of operation for a scanning beam microwave landing system having aerial means for scanning a narrow microwave beam TO and FRO through a scanned angular sector and for transmitting OCI signals with a relatively wider beam pattern to cover OCI sectors to the left and to the right of the scan sector comprising, energizing the aerial means before the TO scan begins to produce the said wide beam pattern on the left of the scanned sector at a time corresponding to a predetermined negative angle of the TO scan with reference to the center line of the scanned sector and which is outside the angular limit of the scanned sector, energizing the aerial means after the TO scan finishes to produce the said wider beam pattern on the right of the scanned sector at a time corresponding to the said predetermined angle of the TO scan but positive with respect to the center line through the scanned sector, and outside the angular limit of the scanned sector, energizing the aerial means before the FRO scan begins to produce the said wider beam pattern again on the right of the scanned sector and at a time corresponding to the said positive predetermined angle as applied to the FRO scan and outside the angular limit of the scanned sector and energizing the aerial means after the FRO scan has finished to produce the said wider beam pattern on the left of the scanned sector at a time corresponding to the said negative predetermined angle of the FRO scan and outside the angular limit of the scanned sector.

4 Claims, 10 Drawing Figures

RECEIVER SIGNAL
FOR ±20° COVERAGE

MICROWAVE LANDING SYSTEMS

This invention relates to scanning beam microwave landing systems for aircraft.

A scanning beam microwave landing system has now been accepted as a standard navigational aid for the future by a number of countries. This system was introduced by the U.S.A. and comprises a ground station including means for scanning a narrow microwave beam TO and FRO through an angular section in azimuth and in elevation apparatus being carried by an aircraft to detect the beam as it passes and to provide in dependence upon such detection an indication of aircraft position relative to the centre line of the sector scanned. This system is now well known and aircraft position is determined in dependence upon the time between detection of the TO and FRO beams by the apparatus carried by the aircraft. One of the characteristics of this system is that an aircraft outside the scanned sector may receive due to multipath effect reflected signals giving an erroneous indication that it is within the sector scanned.

In order to obviate this anomaly it is proposed that in addition to the aerial array required for scanning the sector, out of coverage indicator (OCI) aerials should also be used to provide an out of coverage (that is out of the scanned sector) beam pattern. The out of coverage aerials are energised before the scan and data relating to the signal strength of these signals is stored by apparatus carried by the aircraft and compared with the amplitude of scanned signals subsequently received. The signal strength of the OCI signals is arranged to be such that when the aircraft is within the scanned sector, received scanned signals will always be larger than OCI signals and thus when the scan signals are smaller than the OCI signals they are regarded as being due to multipath effects and rejected. This system although now accepted can be shown to be unsatisfactory under certain site conditions and a good scan or angle guidance signal might be incorrectly rejected or a false scan or angle guidance signal may be accepted. This shortcoming of the present system is due at least in part to the fact that the necessarily broad antenna patterns of the OCI aerials are much more susceptible to multipath signals than the scanned signal which provides guidance.

It is required in some systems to limit the sector coverage scanned say from 40° to 10° or 20° and in this case further aerials are provided known as clearance aerials which provide clearance signals which are radiated from the clearance aerials and stored by apparatus carried by the aircraft. These stored clearance signals are compared with the amplitude of the received scanned signal, whereby the position of an aircraft with respect to the centre line of the limited scanned sector may be determined. In practice the TO and FRO scan signals are prefixed firstly by a preamble comprising data signals indicating the function of the scan (i.e. elevation or azimuth). The preamble is followed by left and right clearance signals which are received and stored by the apparatus aboard the aircraft. The clearance signals are followed by left, right, and possibly rear OCI signals which are also stored. The OCI signals are then followed by the TO and FRO scan signals. It will be appreciated that with limited sector coverage involving the use of clearance signals in addition to OCI signals, the change from clearance to linear guidance by means of the scanned beam will now occur much closer to the sector centre and a long time constant can no longer therefore be used to smooth out scalloping multipath signals. Secondly the aircraft will probably be lower in altitude during the transition to linear guidance since a limited guidance sector is being used and will therefore experience a higher level of multipath signals and thirdly the reduced linear coverage or sector angle scanned will make it much more difficult to allow for any region of uncertainty. It will be appreciated therefore in view of the foregoing, that with limited sector coverage using clearance signals in addition to OCI signals the system will be much more susceptible to errors due to multipath effects.

It is an object of the present invention to provide a scanning beam microwave landing system in which the problems outlined above are obviated or at least significantly reduced.

According to the present invention, a system of operation for a scanning beam microwave landing system having aerial means for scanning a narrow microwave beam TO and FRO through a scanned angular sector and for transmitting signals with relatively wider beam patterns to cover sectors to the left and to the right of the scanned sector comprises, energising the aerial means before the TO scan begins to produce the said relatively wider beam pattern on the left of the scanned sector at a time corresponding to a predetermined negative angle of scan with reference to the centre line of the scanned sector which is outside the angular limit of the scanned sector, energising the aerial means after the TO scan finishes to produce the said wider beam pattern on the right of the scanned sector at a time corresponding to the said predetermined angle of scan but positive with respect to the centre line through the scanned sector which is outside the angular limit of the scanned sector, energising the aerial means before the FRO scan begins to produce the said wider beam pattern again on the right of the scanned sector and at a time corresponding to the said positive predetermined angle as applied to the scan which is outside the angular limit of the scanned sector and energising the aerial means after the FRO scan has finished to produce the said wider beam pattern on the left of the scanned sector at a time corresponding to the said negative predetermined angle of the scan which is outside the angular limit of the scanned sector.

It will be appreciated that the scanned angular sector may be in azimuth and/or in elevation and that the system of operation may be used for clearance or O.C.I. purposes.

The aerial means of the system for elevation or azimuth may comprise an array which produces the scanned narrow microwave beam and two further aerials for producing the wider beam patterns to the left and to the right of the scanned sector respectively.

In one embodiment of the invention the two further aerials may be adapted each to provide beam patterns to the left and right of the scanned sector, the patterns to the left being produced sequentially at times corresponding to predetermined negative angles of scan but outside the scanned sector and the patterns to the right being produced at times corresponding to predetermined positive angles of scan but outside the scanned sector.

The further aerial means for producing the beam pattern to the left of the scanned sector may be arranged to produce sequentially a left OCI beam and a left clearance beam and the further aerial means for producing the beam pattern to the right of the scanned sector may be arranged to produce sequentially a right OCI beam and a right clearance beam, the beams being transmitted at times corresponding to angles of scan outside the scanned sector.

Alternatively the further aerial means for producing the beam patterns to the left of the scanned sector may be arranged to produce sequentially a rear OCI left beam, a front OCI left beam, and a left clearance beam and the further aerial means for producing the beam pattern to the right of the scanned sector may be arranged to produce sequentially a rear OCI right beam, a front OCI right beam, and a right clearance beam, the beams being transmitted at times corresponding to angles of scan which are outside the scanned sector. The further aerial means as aforesaid may comprise a plurality of individual aerials or alternatively they may comprise one aerial array which is adapted to transmit beams at different angles.

It will be appreciated that similar arrays are required both for azimuth and elevation.

Some embodiments of the invention will now be described by way of example with reference to the accompanying drawings in which.

Figure 7:
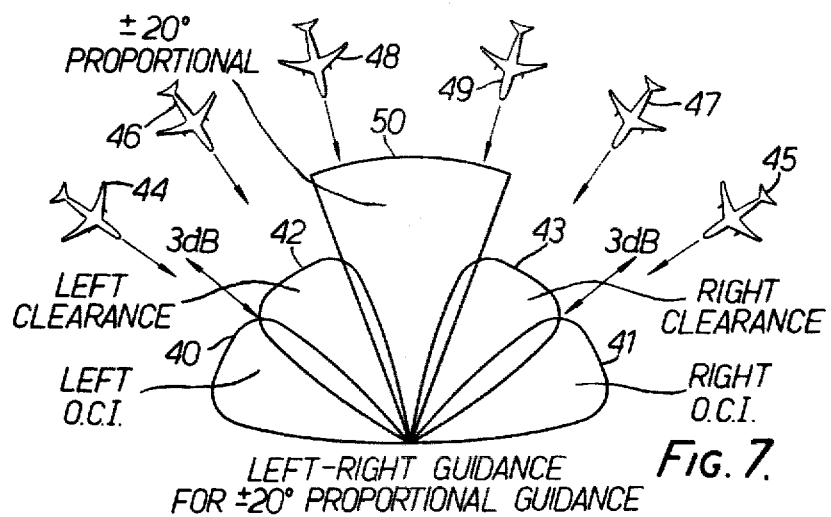
FIG. 7 is a diagram of aerial beams formed in a scanning beam system according to an alternative aspect of the present invention.
Figure 8:
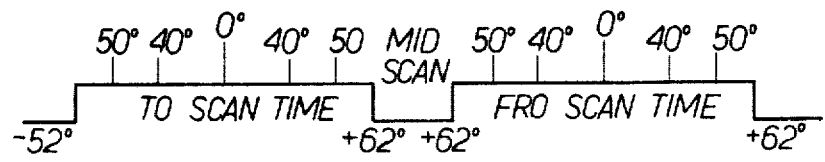
FIG. 8 is a scan/time diagram illustrating the relationship between TO and FRO scans.
Figure 9:
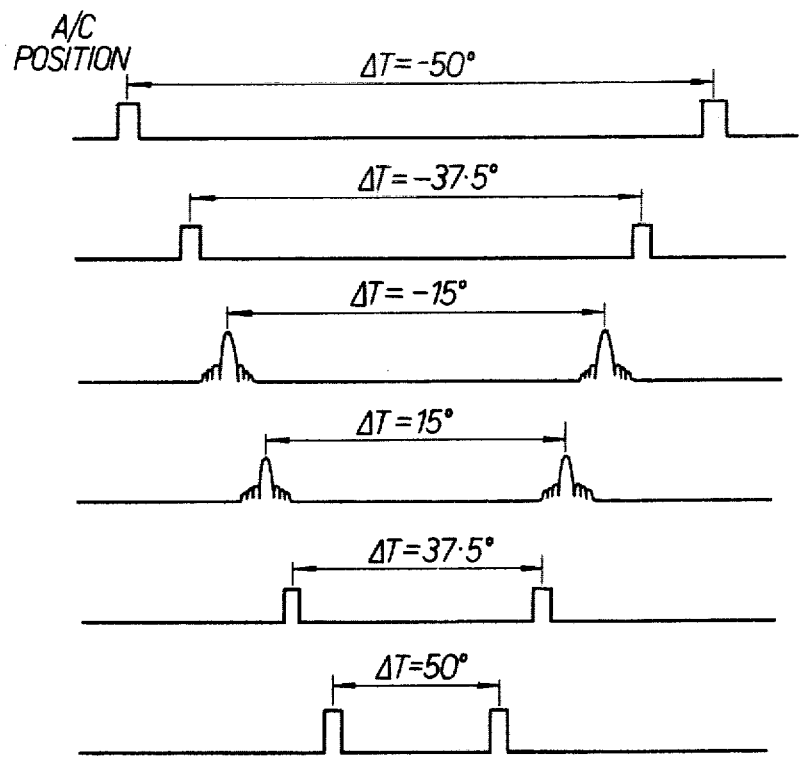
Figure 10:
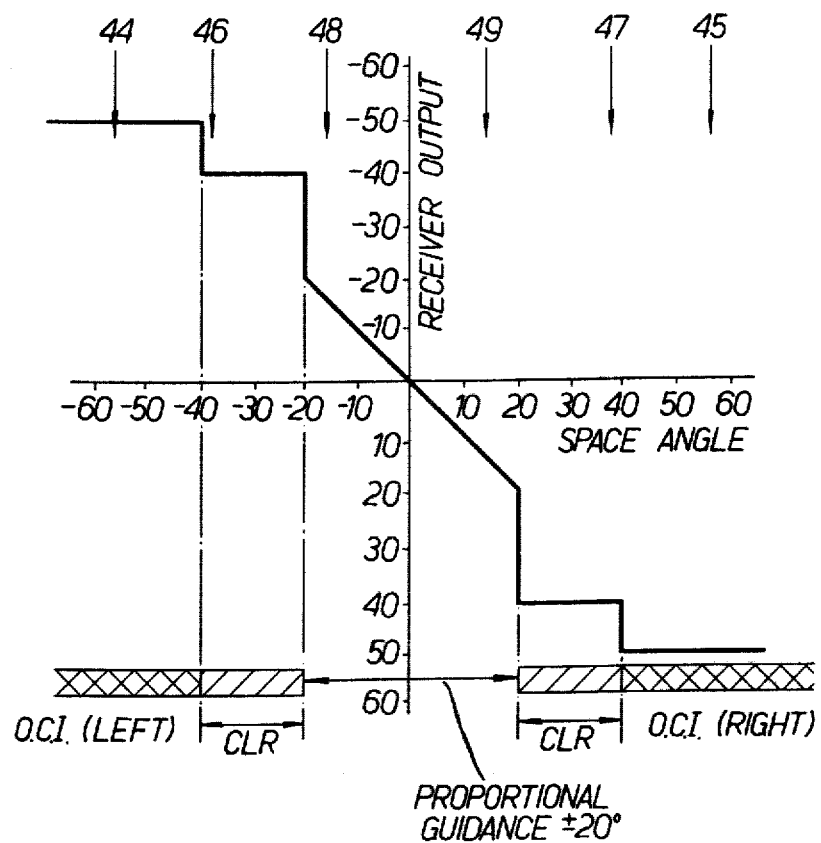

FIG. 9 is a waveform diagram showing waveforms 9a and 9f illustrative of the signals received by aircraft at various angular positions as shown in FIG. 7; and FIG. 10 is a graph showing receiver output for various angular positions in the system described with reference to FIGS. 7, 8 and 9.

Figure 1:
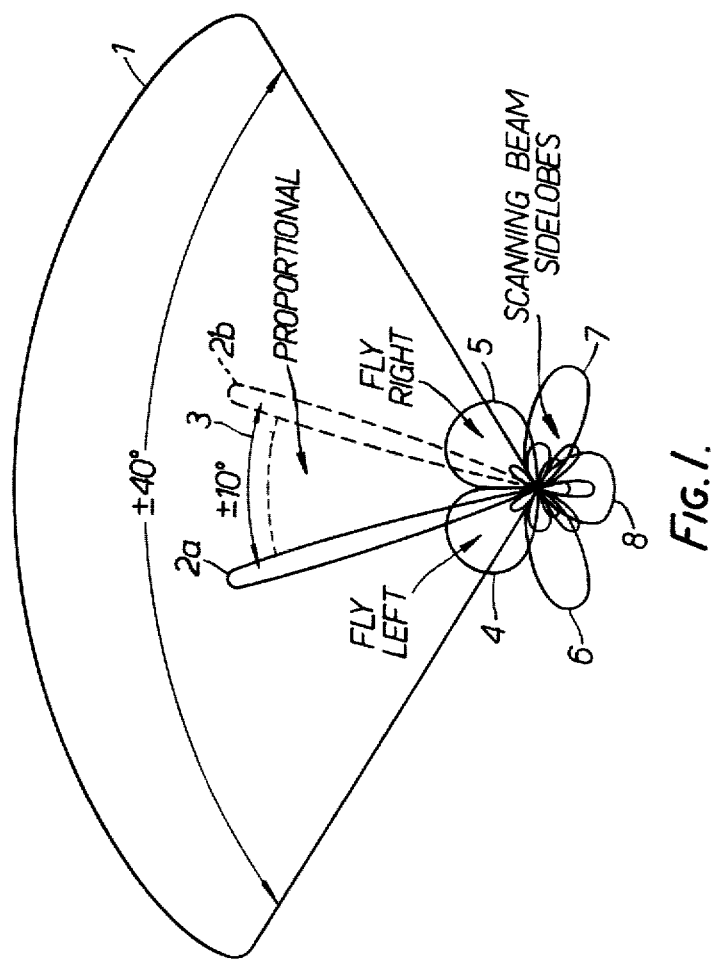
FIG. 1 is a generally schematic diagram showing the beam patterns formed in a known scanning beam microwave landing system.

Referring now to FIG. 1 in a known scanning beam microwave landing system data might be transmitted through an angle of 40° as indicated by the sector 1. The scanned beam guidance signal has a narrow beam width as shown at 2a and 2b and is scanned TO and FRO across a narrow 10° sector 3. In order to provide an indication for aircraft which are outside the sector 3 of their position, two further signals 4 and 5 are radiated to the left and right respectively of the sector 3, the amplitude of the signals radiated at 4 and 5 being compared by apparatus on the aircraft with the scanned signal to provide a positional indication. Thus in a known system left and right clearance beams 4 and 5 are provided outside the scanned beam 3 or proportional guidance region to achieve performance similar to the well known instrument landing system (ILS) clearing function. In order to preclude receiver operation in areas outside the 40° sector 1 up to three OCI or side lobe suppression signals left, right, and rear corresponding to the lobes 6, 7 and 8 are radiated on separate aerials and the pulse amplitude of these signals is detected and compared with the amplitude of the scanned beam signal. The amplitude of the radiated signals are arranged such that if the amplitude of the received scanning beam signal is less than the signals transmitted in the beams 6, 7 and 8 then the received scanning beam signal is classified as erroneous and is suppressed.

Figure 2:
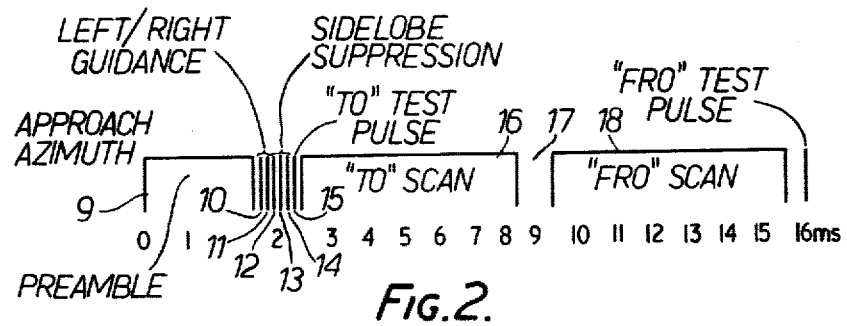
FIG. 2 is a diagram showing the signals radiated to form the beam pattern shown in FIG. 1.

Referring now to FIG. 2 the signals are transmitted in the following order, firstly a preamble data signal 9 is transmitted followed by left and right clearance signals 10 and 11. The clearance signals are followed by left, right and rear OCI or side lobe suppression signals 12, 13 and 14. The OCI signals are followed by a test pulse 15 the function of which is not important and which will not be explained herein. Following the test pulse the TO scan is executed whereby the beam 2a is scanned from left to right so that it assumes the position 2b as shown. After a period as shown in FIG. 2, the FRO scan is executed whereby the beam is scanned from the position 2b as shown in FIG. 1 to the position 2a through an angle of 10°.

The system thus far described is well known but has certain disadvantages which can result in the erroneous acceptance of scanned beam guidance signals or the acceptance of erroneous guidance signals. As just before mentioned the known clearance and OCI comparison techniques of the present U.S.A. system rely on amplitude comparison of the OCI and/or the clearance signals with the scanning beam signal and this results in unsatisfactory performance due to factors which have hereinbefore already been discussed.

It is proposed herein to replace the data like clearance and OCI signals by signals occurring in the scanned period which can be processed in the same way as the scanning beam is processed. This is achieved by transmitting TO and FRO synthetic pulses via the appropriate antennas of the clearance and OCI aerials at predetermined angles within the TO and FRO scan/time slot but outside the actual sector scanned. The TO and FRO pulses of the left OCI antenna would be transmitted at a time equivalent to an angle of say −50° in the scan time slot. The TO and FRO pulses of the right OCI antenna will be transmitted from the right OCI antenna at a time equivalent to plus 50° in the scan/time slot. These synthetic OCI pulses will be arranged to have a length corresponding to the beam width of the scanning beam signal.

The manner in which the synthetic signals are generated and transmitted will now be described with reference to FIGS. 3, 4 and 5. The scanning beam is scanned through a sector 19 of plus and minus 40° with respect to a sector center line 20. To the left of the sector 19 an OCI beam pattern 21 is produced at times which will hereinafter be defined, and to the right of the sector 19 an OCI beam pattern 22 is produced at times which will be hereinafter defined. The scanning beam scans firstly from left to right through the angles −40° to +40° in the TO scan and after an interval 23 between scans, scans from right to left from +40° to −40° in the FRO scan. This can be seen from FIG. 3 and FIG. 4. It is arranged that signals from an OCI aerial producing the beam pattern 21 are transmitted briefly at angles corresponding to −50° in the TO and FRO scans respectively. The signals transmitted to produce the beam 21 are shown in FIG. 5a, as sensed by an aircraft 24 at the position shown in FIG. 3. The pulses shown in FIG. 5a and numbered 25 and 26 will also be sensed but at a smaller amplitude by an aircraft 27 in the position shown. The signals sensed by the aircraft 27 in the position shown are illustrated in FIG. 5b and it will be seen that as well as the pulses 25 and 26 the scanning beam signals 28 and 29 will also be received at a spacing which corresponds to the position of the aircraft 27 with respect to the centre line of the sector 19. The right OCI beam pattern 22 is arranged to be produced at angular positions of +50° in both the TO and FRO scans so as to produce pulses 30 and 31 as shown in FIGS. 5e and 5f. It will be appreciated that an aircraft 32 at the position shown, will receive only the pulses 30 and 31, whereas an aircraft 33 at the position shown in FIG. 3 will receive the scanning beam signals spaced at an interval which indicates its position within the sector 19 with respect to the centre line 20 and additionally it will receive the pulses 30 and 31. Aircraft 34 and 35 as shown in FIG. 3 will receive only signals 36, 37, 38, and 39 respectively as shown in FIGS. 5c and 5d respectively, the angular position of the aircraft being indicated in accordance with the spacing between the pulses.

Figure 3:
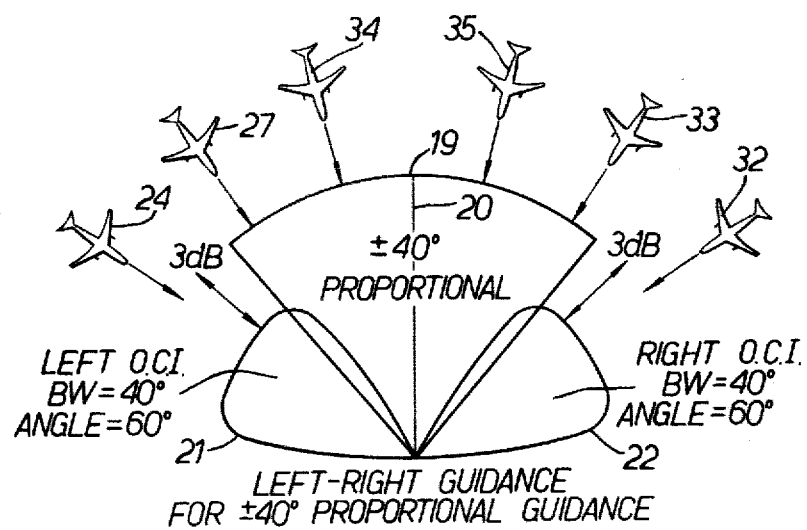
FIG. 3 is a generally schematic diagram showing beam patterns used in one embodiment of a scanning beam microwave landing system according to the present invention.
Figure 4:
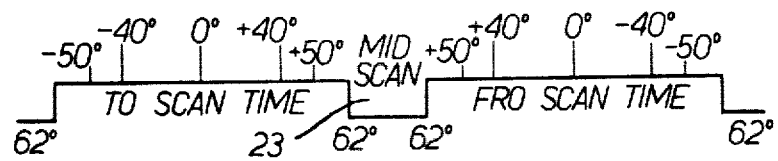
FIG. 4 is a scan/time diagram illustrating the relationship between TO and FRO scan times.
Figure 5:
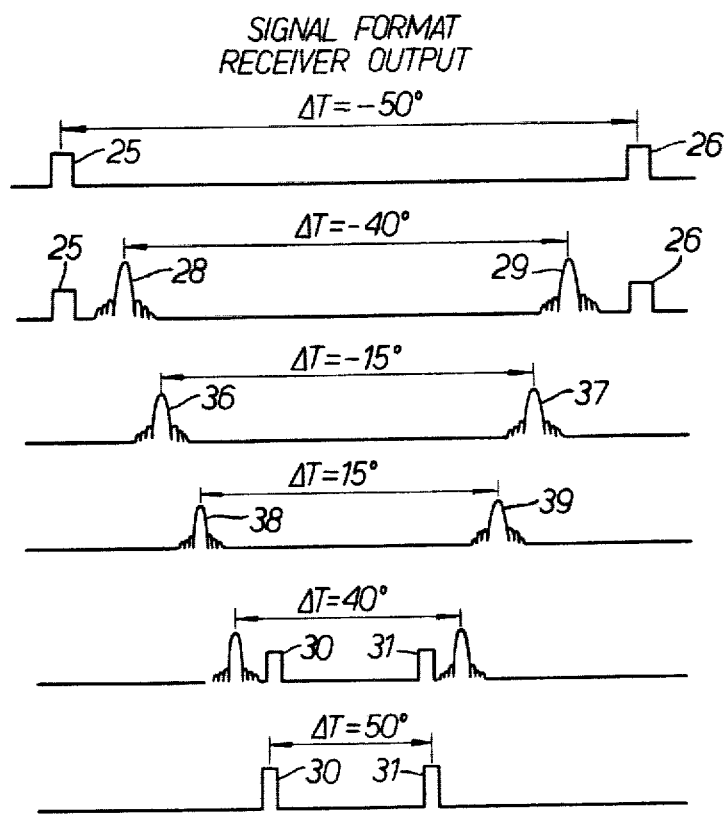
FIG. 5 is a wave form diagram showing wave forms 5a to 5f as received by aircraft at various angular positions as shown in FIG. 3.
Figure 6:
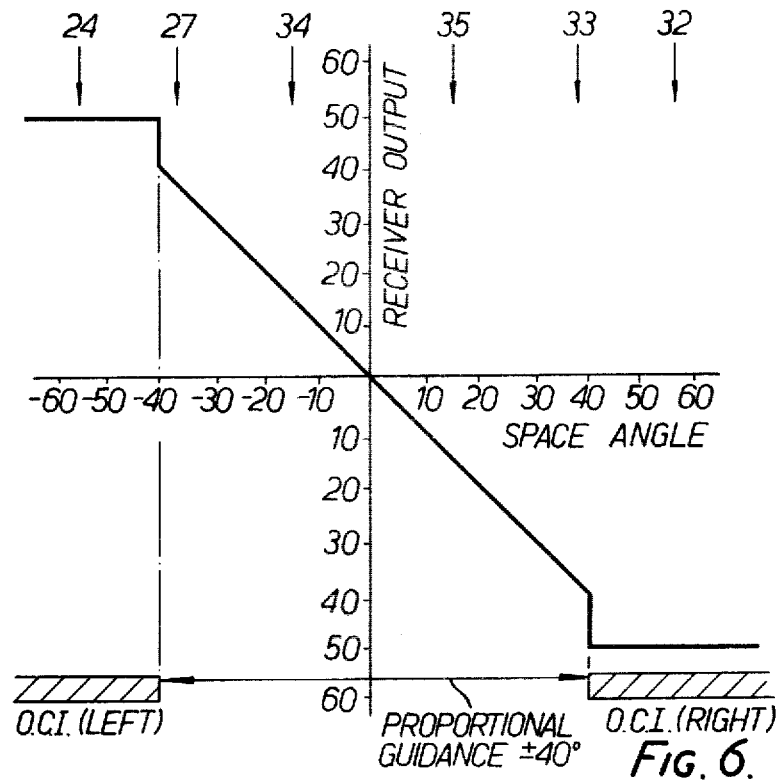
FIG. 6 is a graph showing receiver output for various angular positions for operation of the system producing beams as shown in FIG. 3.

From FIGS. 3, 4 and 5 it will be appreciated that by analysing the signals received an aircraft may determine whether or not it is within the sector 19 or whether it is to the left or to the right of the sector 19. As has already been mentioned, the width of the pulses 25, 26, 30 and 31 is determined by the time for which they are transmitted and it is convenient to arrange that they are transmitted for a time which corresponds to the beam width of the scanning beam. Signals received by the aeroplanes 24, 27, 34, 35, 33 and 32 are illustrated in FIG. 6 wherein it can be seen that the angular position of the aircraft are indicated in dependence upon receiver output and wherein it can be seen that for angles beyond 40° OCI signals are detected indicating that the aircraft is out of coverage. If an aircraft is out of coverage, once an aircraft enters the proportional guidance zone or sector 19, the validation circuit which forms part of known equipment will reduce the confidence counter and start to acquire and track the scanning beam signal since its amplitude will be greater than the right or left OCI signal shown in FIGS. 5b, 5c, 5d and 5e. In this respect therefore the proposed system is fully compatable with existing equipment since the function of the validation circuits and confidence counter are the same.

A power margin of 3 db between the scanning beam and the clearance signals is necessary to avoid any false course or degradation of performance within the proportional guidance zone i.e. any clearance signal reflected back within the proportional guidance zone 19 would not have any effect on acquisition and validation of the scanning beam signal. Since the same sub routine for aquisition and validation is used for both clearance and scanning beam signal processing any multipath signal from within the proportional guidance sector 19 reflected into the clearance zone, that is the zone outside the sector 19, will have to satisfy the aquisition and validation requirements before the receiver starts to track it. Since the aircraft will probably be high in altitude in the clearance zone and will therefore experience a lower level of multipath signals the chance of tracking the multipath signal is remote.

The techniques of aquisition validation and tracking are well known to those skilled in the art and are common to known scanning beam microwave landing systems and will therefore not be explained in detail herein.

An alternative embodiment of the invention will now be described with reference to FIGS. 7, 8, 9 and 10 wherein left and right OCI beams 40, 41 are radiated sequentially with left and right clearance beams 42, 43. The left OCI beam only is radiated at −50° during the TO and FRO scan/times and this is shown in FIG. 9a. The right OCI beam pattern 41 is radiated only at angular positions of +50° during the TO and FRO scan as shown in FIG. 9f. Thus signals as shown in FIG. 9a will be received by an aircraft 44 in the position shown in FIG. 7 and signals corresponding to those shown in FIG. 9f will be received by an aircraft 45 as shown in FIG. 7. Left clearance signals having a beam pattern 42 are transmitted only at angles of −40° in the TO and FRO scan periods to produce pulses as shown in FIG. 9b and right clearance signals having a beam pattern 43 are transmitted only at the 40° scan position in the TO and FRO scans to produce signals as shown in FIG. 9e. Thus an aircraft 47 as shown at the angular position in FIG. 7 will receive only the signals shown in FIG. 9e. Aircraft 48 and 49 are positioned to receive the scanning beam only and so will receive the signals as shown in FIG. 9c and 9d respectively.

Thus it will be apparent from FIG. 10 that aircraft 44, 46, 48, 49, 47 and 45 will receive signals as shown, indicating not only their position within the 20° sector of scan, but also whether they are in the out of coverage areas covered by the beams 40 and 41 or whether they are in the left or right clearance areas covered by the beams 42 and 43.

It will be appreciated that in the foregoing embodiments of the invention the clearance or OCI signals are processed in the same way as the proportional guidance or scanning signals and that aquisition validation and tracking routines according to known principals may be applied instead of the existing amplitude comparison. In known systems the existing clearance and OCI signals occupy 0.666 milliseconds following the function preamble. With the system according to the present invention however this time may be added to the preamble to improve the system performance.

Various modifications may be made to the embodiments shown without departing from the scope of the invention and for example it may be arranged to radiate OCI beam patterns corresponding to the beam patterns 40 and 41 but to the rear of the sector 50 whereby further out of coverage indication may be afforded. It will be appreciated that with this arrangement further synthetic pulses would be transmitted corresponding to different angular positions outside the scanned sector for example at plus and minus 55°.

What we claim is:

1. A system of operation for a scanning beam microwave landing system having aerial means for scanning a relatively narrow microwave beam to and fro through a scanned angular sector and for transmitting signals with relatively wider beam patterns to cover sectors to the left and to the right of the scanned sector which comprises, energising the aerial means before the TO scan begins to produce the said relatively wider beam pattern on the left of the scanned sector at a time corresponding to predetermined negative angle of scan with reference to the centre line of the scanned sector which is outside the angular limit of the scanned sector, energising the aerial means after the TO scan finishes to produce the said wider beam pattern on the right of the scanned sector at a time corresponding to the said predetermined angle of scan but positive with respect to the centre line through the scanned sector which is outside the angular limit of the scanned sector, energising the aerial means before the FRO scan begins to produce the said wide beam pattern again on the right of the scanned sector and at a time corresponding to the said positive predetermined angle as applied to the scan which is outside the angular limit of the scanned sector and energising the aerial means after the FRO scan has finished to produce the said wider beam pattern on the left of the scanned sector at a time corresponding to the said negative predetermined angle of the scan which is outside the angular limit of the scanned sector.

2. Apparatus for putting into effect a system according to claim 1 comprising an array adapted to produce the narrow microwave beam and two further aerials for producing the wider beam patterns to the left and to the right of the scanned sector respectively.

3. Apparatus as claimed in claim 1 wherein the aerial means comprises an array adapted to produce the narrow microwave beam and four further aerials arranged to produce a left OCI beam and a left clearance beam, and a right OCI beam and a right clearance beam, the beams being transmitted at times corresponding to angles of scan outside the scanned sector.

4. Apparatus as claimed in claim 1 wherein the aerial means comprises array for producing the narrow microwave beam and five further aerials arranged to produce a rear OCI beam a front OCI left beam and a left clearance beam, and a front OCI right beam and a right clearance beam, the beams being transmitted at times corresponding to angles of scan which are outside the scanned sector.

* * * * *